United States Patent [19]

Kitai et al.

[11] 4,209,242
[45] Jun. 24, 1980

[54] EXPOSURE CONTROL DEVICE FOR AUTOMATIC FOCUSING CAMERA

[75] Inventors: Kiyoshi Kitai; Yukio Morino; Shogo Kato; Ichiro Nemoto, all of Yotsukaido, Japan

[73] Assignee: Seiko Koki Kabushiki Kaisha, Tokyo, Japan

[21] Appl. No.: 961,729

[22] Filed: Nov. 17, 1978

[30] Foreign Application Priority Data

Nov. 18, 1977 [JP] Japan ................................. 52-138735

[51] Int. Cl.² .......................... G03B 7/08; G03B 9/08; G03B 13/02
[52] U.S. Cl. .................................... 354/25; 354/195; 354/234
[58] Field of Search .................... 354/25, 195, 38, 234, 354/235, 230, 30–35

[56] References Cited
U.S. PATENT DOCUMENTS

| 3,208,365 | 9/1965 | Cooper et al. | 354/234 |
| 3,698,304 | 10/1972 | Tenkumo | 354/234 |
| 3,713,371 | 1/1973 | Kurihara et al. | 354/195 X |

Primary Examiner—Donald A. Griffin
Attorney, Agent, or Firm—Robert E. Burns; Emmanuel J. Lobato; Bruce L. Adams

[57] ABSTRACT

An automatic focusing camera capable of automatically focusing the photographic lens thereof by a system actuated by a signal produced by a focus detection circuit when the distance between the object to be photographed by the camera is detected includes an exposure control device comprising an exposure control circuit and an electromagnet. A photographic lens focusing member is movable in response to the shutter release operation and is stopped in response to the magnetizing of the electromagnet. An exposure device is actuated to open to start the exposure after the photographic lens focusing member is stopped, and is closed in response to the demagnetizing of the electromagnet which occurs upon the receipt thereof of the exposure completion signal generated by the exposure control circuit. In this way, a common electromagnet is used for both the focus control and the exposure control to simplify the construction of the camera and to reduce the cost thereof.

5 Claims, 4 Drawing Figures

EXPOSURE CONTROL DEVICE FOR AUTOMATIC FOCUSING CAMERA

BACKGROUND OF THE INVENTION

This invention relates to a camera provided with an automatic focusing device and an exposure control device, more particularly to a control device for regulating the focus position of the photographic lens and for controlling the exposure.

SUMMARY OF THE INVENTION

The main object of the invention is to have the focusing and the exposure being controlled by a common electromagnetic device to provide a camera which is simply constructed with less component parts and low priced.

The object of the present invention is attained by adapting an electromagnet to be magnetized when a focus detection signal is produced by a focus detection circuit and to be demagnetized when an exposure completion signal is produced by an exposure control circuit and providing a photographic lens focusing member operated in association with the movement of an actuating member started by the shutter release operation, so as to magnetize the electromagnet to retain the photographic lens focusing member with a retaining member associated with the electromagnet at the focus detection signal produced by the focus detection circuit when the distance between the photographing object and the camera is detected, to open the shutter blade by releasing an opening hook of the exposure device according to the successive movement of the actuating member and to demagnetize the electromagnet to close the shutter blade at a selected exposure time completion signal given by an exposure time control circuit actuated in connection with the opening of the shutter blade.

In a modification, the electromagnetic releasing of the opening hook of the exposure device is possible by adapting the electromagnet to release the opening hook simultaneously with the retention of the photographic lens focusing member when it is magnetized instead of releasing the opening hook with the actuating member so that the regulation of the focus position of the photographing lense and the operation of the shutter are controlled by a common electromagnetic device.

DETAILED DESCRIPTION OF THE INVENTION

Referring now to FIGS. 1-4, an explanation will be made of preferred embodiments of the present invention.

Figure 1:
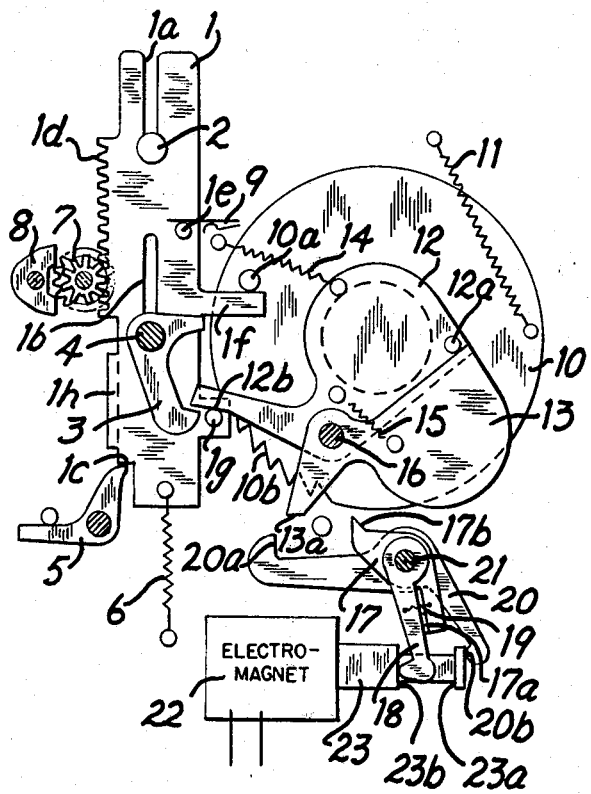
FIG. 1 is a schematic illustration of a control system for a camera having an electromagnet for the focus position regulation and the exposure control.
Figure 2:
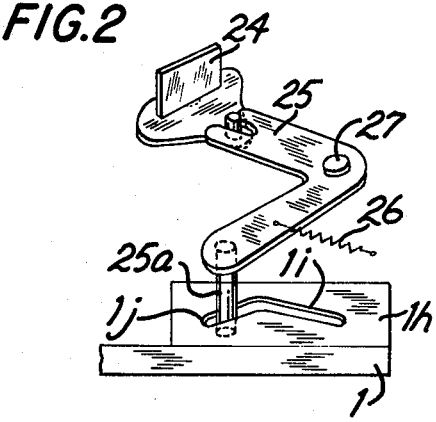
FIG. 2 illustrates in perspective the interconnection of an actuating member and a movable mirror.
Figure 4:
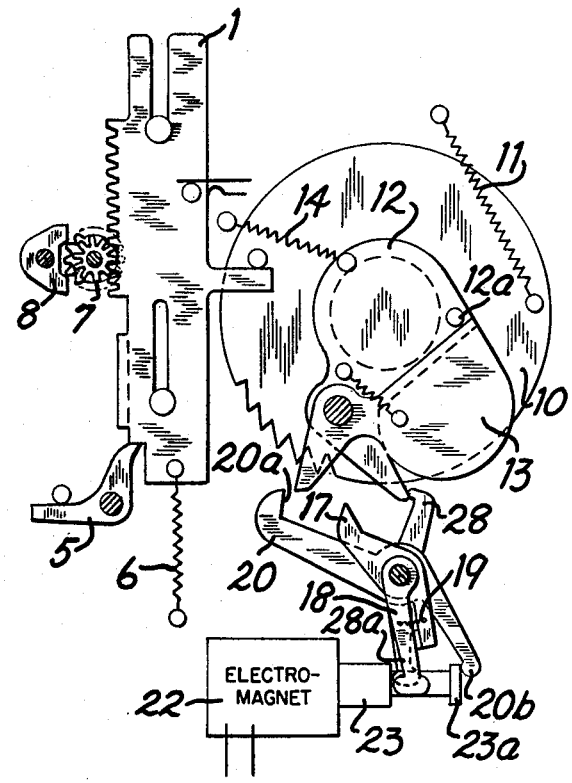
FIG. 4 is a schematic illustration of a second embodiment of the control system of the present invention having an electromagnetic device for the focus position regulation and the exposure control.
Figure 3:
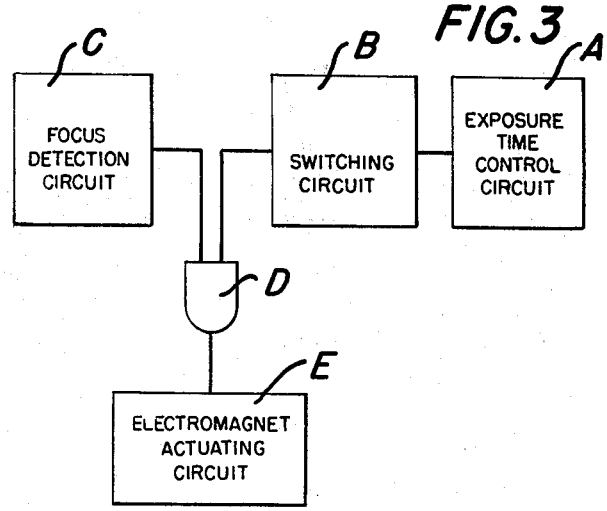
FIG. 3 is a block diagram of a control circuit applied to the camera of this invention.

FIG. 1 illustrates the control unit for a camera provided with an electromagnet used for focus position regulation and exposure control, FIG. 2 illustrates the interconnection of an actuating member and a movable mirror, FIG. 3 is a block diagram showing the fundamental elements of the control unit applied to the camera of the present invention and FIG. 4 illustrates a modified form of the control unit for a camera provided with an electromagnet used for focus position regulation and exposure control.

Referring to FIG. 1, an actuating member (1) is vertically movable and guided by a pin (2) and an axial pin (4) of an opening blade retaining hook (3) engaging with a slot (1a) and a slot (1b), respectively, and is urged downwards by a spring (6) while retained with a detent (5) in the charged position. A delay device, which is well known, comprising components (7) and (8) is engaged with a rack (1d) of the actuating member (1). A switch (9) for a focus detection module is actuated by a pin (1e) of the actuating member (1). The pin (1e) is adapted to turn the opening blade retaining hook (3) clockwise when the actuating member (1) moves downwards. A pin (1g) of the actuating member (1) charges the shutter blade as will be described later. A photographic lens focusing ring (10), hereinafter referred to as AF ring, is urged counterclockwise by a spring (11). Also shown in FIG. 1 are a charging pin, (10a) a ratchet 10b for focus position regulation, an opening blade 12, a closing blade 13 bearing on a pin (12a) fixed on the opening blade (12), an arm 12b for charging the opening blade, a spring 14 for opening the opening blade (12) and the closing blade (13), and a pivot 16 about which the opening and the closing blades reciprocate. A pawl (17) has a tip (17b) and a raised end (17a) is connected with a lever (18) by a spring (19) and urged clockwise by a spring, not shown, also engages with the ratchet (10b) of the AF ring (10) to stop the AF ring (10) at the focus position. A closing blade retaining pawl (20) has a tip (20a) and an arm (20b). An armature (23) of an electromagnet (22) has actuating parts (23a) and (23b). In FIG. 2, illustrating the interconnection of the actuating member (1) and a movable mirror (24) in perspective, grooves (1i) and (1j) guide a pin (25a) fixed to a mirror lever (25) so that the movable mirror (24) fixed on the mirror lever (25) is reciprocated about a pivot (27) while detecting the focus position. A spring (26) urges the mirror lever (25) counterclockwise. Referring to FIG. 3, a preferred example of the control circuit which applies to the camera of this invention comprises of an exposure time control circuit (A), a switching circuit (B), a focus detection circuit (C), AND circuit module (D) and an electromagnet actuating circuit (E). The AND circuit module (D) detects the switching of the circuits (c) and (B) and actuates the electromagnet actuating circuit (E).

In the operation, starting from the charged state as shown in FIG. 1, the actuating member (1) moves downwards, pulled by the spring (6) guided by the pin (2) and the axial pin (4) of the retaining hook (3) slidably fitted in the slots (1a) and (1b), respectively, when the detent (5) is turned counterclockwise by a release operation to cancel the retention of the actuating member (1) at the retaining part (1c). The actuating member (1) moves at a controlled speed regulated by the delay device comprising the components (7) and (8). During the downward movement, the actuating member (1) first closes the switch (9) of the focus detection module (C) while turning the mirror lever (25) by the engagement of the groove (1j) with the pin (25a) to turn the movable mirror (24) counterclockwise. During the counterclockwise turning of the movable mirror (24), the focus position is detected by the combination of the movable mirror (24) and the fixed mirror, not shown, and this focus position is memorized by the focus detection module (C). According to the successive downward movements of the actuating member (1), the pin (25a) is guided by the groove (1i) so that the movable mirror (24) starts turning counterclockwise. The AF ring (10) turns counterclockwise pulled by the spring (11) while the pin (10a) of the AF ring (10) follows the arm (1f) of the actuating member (1) and when the movable mirror (24) comes to the memorized focus position, the focus detection module (C) provides a signal to magnetize the electromagnet (22) so that the armature (23) is attracted leftwards, consequently the actuating part (23a) turns the lever (18) clockwise against the spring force provided by a spring, not shown, so that the pawl (17) connected with the lever (18) by a spring (19) is also turned clockwise to be engaged with the ratchet (10b) of the AF ring (10), thus the AF ring (10) is stopped at the focus position and the photographic lens is focused on the photographic object. In the meantime, the closing blade retaining pawl (20) turns clockwise pulled by a spring, not shown, in accordance with the leftward movement of the armature (23) and retains the closing blade (13) by the enagement of the tip (20a) with the tongue (13a) of the closing blade (13). Around the final stage of the downward movement of the actuating member (1), the pin (1e) turns the opening blade retaining hook (3) about the pivot (4) to cancel the retention on the opening blade (12) so that the opening blade (12) turns counterclockwise pulled by the spring (14) about the pivot (16) to open the aperture. At this moment, the control circuit (A) controlling the exposure time is actuated by means of a well known timing device, not shown, and after a fixed time, the electromagnet (22) is demagnetized by switching off the electromagnet actuating circuit (E) by the off-signal of the switching circuit (B) transmitted through the AND circuit (D) so that the armature (23) returns to the original position as shown in FIG. 1. Consequently, the actuating part (23a) of the armature (23) turns the closing blade retaining pawl (20) counterclockwise to cancel the retention on the closing blade (13) so that the closing blade (13) turns, pulled by the spring (15) extending between the closing blade (13) and the opening blade (12), as far as it can until the closing blade (13) bears against the pin (12a) fixed to the opening blade (12) to complete the exposure. The device is recharged by pushing up the actuating member (1) against the spring force provided by the spring (6) until it is retained by the detent (5) at the retaining part (1c). During the charging procedure, the AF ring (10) is turned clockwise against the spring force provided by the spring (11) by the engagement of the protrusion (1f) with the pin (10a) and is stopped at the original position when the actuating member (1) in the position of FIG. 1 is retained. Meanwhile, the opening blade (12) is turned clockwise against the spring force provided by the spring (14) pushed by the pin (1g) of the actuating member (1) at the arm (12b) until the arm (12b) is retained with the retaining hook (3). The closing blade (13) also is returned to the original position, together with the opening blade (12), pushed by the pin (12a) as it is connected with the opening blade (12) by the spring (15). Thus the device is recharged.

Referring to FIG. 4 showing a second embodiment according to the present invention, an explanation will be given of the structure and the performance of the device, wherein like parts or corresponding parts are designated by like reference numerals and the explanation thereof will be omitted to avoid duplication. Starting from the charged state as shown in FIG. 4, the actuating member (1) moves downwards pulled by the spring (6) at a controlled speed regulated by the delay device comprising the components (7) and (8) when the detent (5) is turned counterclockwise by the release operation to cancel the retention of the detent (5) on the actuating member (1), while the AF ring (10) turns counterclockwise, pulled by the spring (11), following the movement of the actuating member (1). The movable mirror unit as shown in FIG. 2 also starts turning simultaneously with the commencement of the movement of the actuating member (1) and performs the focus position detection. When the focus position is detected, the focus detection circuit (C) is actuated to provide a signal to magnetize the electromagnet (22) so that the electromagnet (22) attracts the armature (23) so that the lever (18) is turned clockwise, therefore, the detent (17) for stopping the AF ring (10) connected with the lever (18) with the spring (19) is engaged with the ratchet provided on the AF ring (10) to stop the AF ring (10) at the focus position. During this procedure, the closing blade retaining pawl (20) turns clockwise pulled by a spring, not shown, as the arm (20b) follows the leftward movement of the armature (23) in contact with the actuating part (23a) and retains the closing blade (13) with the tip (20a).

The operating procedure as described hereinbefore is identical with that of the first embodiment shown in FIG. 1. According to this second embodiment, in the following procedure, the arm (28a) of the detent (28) retaining the opening blade (12) is turned clockwise in accordance with the attraction of the armature (23) so that the opening blade (12) is released to start the exposure. The operation of the closing blade is identical with that of the first embodiment as shown in FIG. 1, in which the demagnetizing of the electromagnet (22) is controlled by the electric control circuit as shown in FIG. 3 after a fixed period of time to release the closing blade (13). The device is recharged by pulling up the actuating member (1) until the actuating member (1) is retained by the detent (5) while the opening blade (12) is retained by the detent (28) and the closing blade (13) is pushed back by the pin (12a) fixed to the opening blade (12) to the charged position as shown in FIG. 4.

Although an explanation has been made on the preferred embodiments according to the invention employing an electromagnet having an armature of the plunger type, an electromagnet of the any common type may of course be used. As for the opening and the closing blades, the sliding type blades may be used instead of the reciprocating blades which reciprocate about a pivot as applied to the embodiments of this invention. Furthermore, while the focus detecting device of the preferred embodiments are provided with a reciprocating movable mirror, various methods, such as a vibrating movable mirror, which have previously been introduced may be used without departing from the sprit of the invention.

According to the present invention as described above, an electromagnetic device is commonly used for the focus control and the exposure control, whereby the camera of this invention is simply constructed with less component parts and is low priced. In a modified form of the present invention, the electromagnetic device is used for the release operation of the aperture providing an electromagnetic release system. Accordingly, the present invention has an advantage that the photographic lens focusing, aperture opening and aperture closing are controlled together by one electromagnetic device.

We claim:

1. An exposure control device for an automatic focusing camera capable of automatically focusing the photographic lens thereof by a system actuated by a signal produced by a focus detection circuit when the distance between the object to be photographed and the camera is detected, the device comprising an exposure control circuit for producing an exposure completion signal; an electromagnet magnetized in response to the focus detection signal produced by said focus detection circuit and demagnetized in response to the exposure control circuit; a photographic lens focusing member movable in response to a shutter release operation and stopped in response to the magnetizing of said electromagnet; and an exposure device actuated to open to start the exposure after said photographic lens focusing member is stopped and closed in response to the demagnetizing of said electromagnet.

2. An exposure control device for an automatic focusing camera as set forth in claim 1, wherein both the stopping of said photographic lens focusing member and the actuation of said exposure device to start the exposure are controlled by the magnetizing of said electromagnet.

3. An automatic focusing camera of the type having a lens and an actuatable shutter release mechanism comprising: a focus detection circuit for producing a focus detection signal when the object to be photographed by the camera is detected; an exposure control circuit for producing an exposure completion signal when the exposure is to be ended; actuatable means controlled by the focus detection and exposure control circuits for automatically focusing the lens comprising electromagnetic means magnetized in response to the focus detection signal and demagnetized in response to the exposure completion signal, and a lens focusing member movable in response to actuation of the shutter release mechanism and stopped in response to the magnetizing of the electromagnetic means to focus the lens; and shutter means opened upon the stopping of the focusing member and closed in response to the demagnetizing of the electromagnetic means.

4. The camera according to claim 3; wherein the shutter means includes means responsive to the magnetizing of the electromagnetic means for opening the shutter means.

5. The camera according to claim 3 or claim 4; wherein the electromagnetic means comprises a single electromagnet.

* * * * *